June 17, 1930. J. G. DAVIDSON 1,765,211
REFRIGERANT
Filed April 7, 1927

INVENTOR:
Joseph G. Davidson,
BY
Byrnes Townsend & Brickenstein,
ATTORNEYS.

Patented June 17, 1930

1,765,211

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

REFRIGERANT

Application filed April 7, 1927. Serial No. 181,866.

This invention relates to refrigerating systems and comprises certain novel refrigerating media utilized in connection therewith.

Figure 1:
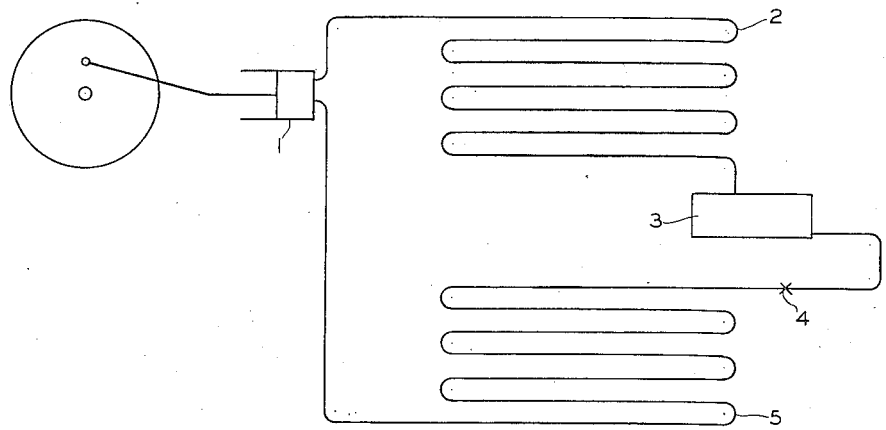

As is well known, a refrigerating system of the cyclical type comprises as its essential parts a compressing device, as for example a motor-driven compressor pump; a cooling coil or equivalent means for liquefying the compressed gas; a vaporization or expansion equipment where heat is absorbed from brine or other surrounding medium during vaporization of the liquid; and a refrigerant possessing such physical properties as to enable it to pass alternately and repeatedly between the liquid and vapor phases under the pressure and temperature conditions obtaining in the cycle. A typical system of this kind is diagrammatically illustrated in Fig. 1 of the accompanying drawing, wherein 1 indicates a motor-driven compressor; 2 a condenser; 3 a receiver for the liquefied refrigerant; and 4 an expansion valve through which the refrigerant is permitted to vaporize at a controlled rate into the refrigerating coil or equivalent device 5, whence it is returned to the compressor 1, thus completing the cycle. The present invention relates to refrigerants for use in a system of this kind, and comprises certain novel refrigerants containing vinyl chloride, $CH_2:CHCl$.

Figure 2:
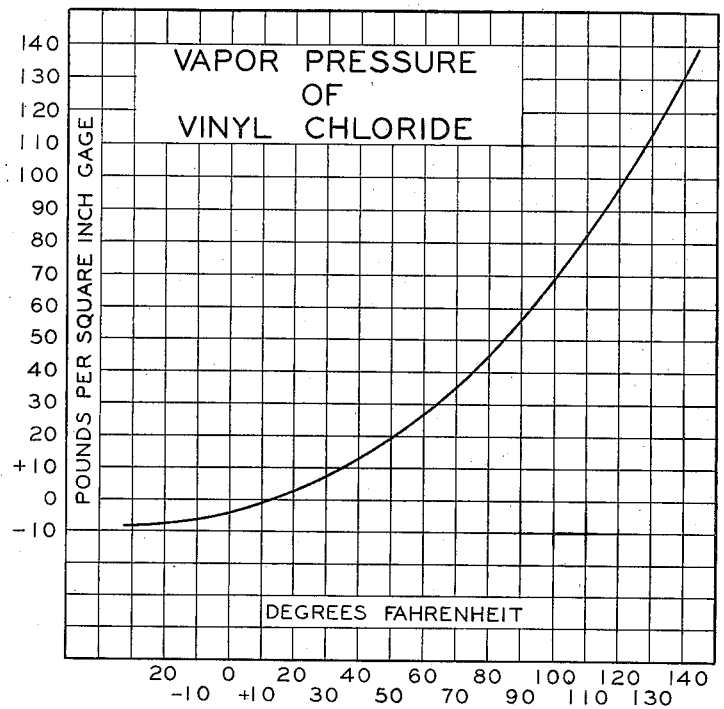

Fig. 2 shows the vapor pressure of vinyl chloride at various temperatures.

Of the refrigerants which are in commercial use in cycles such as that described above, ammonia and carbon dioxide have very low boiling points and are suitable where relatively intense refrigeration is required, but on compression they exert head-pressures which are objectionably high for some types of installations, particularly small units such as are used for household and similar purposes where only moderate refrigeration is required. Sulphur dioxide has a more favorable boiling point for these latter uses, but it possesses suffocating properties and in the presence of moisture is corrosive to the machines. Ethyl and methyl chlorides have been used but the boiling point of the former is somewhat too high and of the latter somewhat too low for the best results. Of the hydrocarbon refrigerants isobutane has a suitable boiling point ($-11.5$ to $-12.5°$ C.) but like the other hydrocarbons it readily forms inflammable mixtures with air.

Vinyl chloride boils at $-14.2 \pm 0.5°$ C. and in this respect is approximately equivalent to sulphur dioxide and isobutane. As compared with the former, vinyl chloride is exceedingly stable and therefore non-corrosive to the refrigerating machines, while it is less inflammable than isobutane.

Vinyl chloride can be used as a refrigerant either in pure or nearly pure form or in admixture with other refrigerants. By combining it with one or more other volatile liquids miscible and compatible with it, such as ethyl chloride, normal or isobutane, methyl chloride, propane or ethane, the vapor pressure can be varied through a wide range. The vinyl chloride will of course tend to diminish the inflammability of hydrocarbon mixed with it. The boiling point of vinyl chloride is distinctly below the average temperature of the brine (where used) and when it is admixed with another refrigerant boiling in the same approximate temperature range, there is no marked tendency of the compound refrigerant to separate by fractional distillation at one point in the cycle.

Where vinyl chloride is added to one or more other chemical compounds to form a refrigerating mixture, its effect will usually not be substantial unless at least about 20% of vinyl chloride is present in the mixture.

I claim:

1. A refrigerant containing at least 20% of vinyl chloride.

2. A refrigerant containing vinyl chloride, together with a lower boiling substance having the type formula $C_nH_{2n+1}R$, where R is either hydrogen or halogen the proportion of each of the recited substances present in the refrigerant being at least 20%.

3. A refrigerant containing vinyl chloride and methyl chloride the proportion of each of the recited substances present in the refrigerant being at least 20%.

4. A refrigerating process which comprises evaporating vinyl chloride at a low temperature in thermal contact with a substance to be cooled; condensing the resultant vapor; and bringing the liquid so formed into thermal contact with a substance to be cooled.

5. A refrigerating process which comprises evaporating at a low temperature and in thermal contact with a substance to be cooled a mixture containing vinyl chloride and a lower boiling chemical compound having the type formula $C_nH_{2n+1}R$, where R is either hydrogen or halogen; condensing the resultant vapor; and bringing the liquid so formed into thermal contact with a substance to be cooled.

6. A refrigerating process which comprises evaporating a mixture containing vinyl chloride and methyl chloride at a low temperature and in thermal contact with a substance to be cooled; condensing the resultant vapor; and bringing the liquid so formed into thermal contact with a substance to be cooled.

In testimony whereof, I affix my signature.

JOSEPH G. DAVIDSON.